(12) United States Patent
Sheikh et al.

(10) Patent No.: US 9,893,746 B2
(45) Date of Patent: Feb. 13, 2018

(54) ENERGY EFFICIENT POLYNOMIAL KERNEL GENERATION IN FULL-DUPLEX RADIO COMMUNICATION

(71) Applicant: Intel Corporation, Santa Clara, CA (US)

(72) Inventors: Farhana Sheikh, Hillsboro, OR (US); Ching-En Lee, Hillsboro, OR (US); Shu-Ping Yeh, New Taipei (TW); Feng Xue, Redwood City, CA (US); Anuja Surendra Vaidya, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 14/749,766

(22) Filed: Jun. 25, 2015

(65) Prior Publication Data
US 2016/0380653 A1 Dec. 29, 2016

(51) Int. Cl.
*H04B 3/20* (2006.01)
*H04B 1/04* (2006.01)
*H04B 1/12* (2006.01)
*H04L 5/14* (2006.01)
*H04B 1/525* (2015.01)

(52) U.S. Cl.
CPC ............. *H04B 1/0475* (2013.01); *H04B 1/12* (2013.01); *H04B 1/525* (2013.01); *H04L 5/14* (2013.01)

(58) Field of Classification Search
CPC .......... H04B 1/0475; H04B 1/10; H04B 1/12; H04B 1/1027; H04B 1/1036; H04B 1/525; H04L 5/14
See application file for complete search history.

(56) References Cited

U.S. PATENT DOCUMENTS

| | | | |
|---|---|---|---|
| 9,276,602 B1 * | 3/2016 | Pagnanelli | H03M 3/358 |
| 2003/0101206 A1 * | 5/2003 | Graziano | H04L 1/0001 |
| | | | 708/277 |
| 2004/0155707 A1 * | 8/2004 | Kim | H03F 1/3247 |
| | | | 330/149 |
| 2005/0058302 A1 * | 3/2005 | Dance | H04L 25/03012 |
| | | | 381/94.7 |
| 2005/0131973 A1 * | 6/2005 | Chambers | H03M 1/129 |
| | | | 708/204 |
| 2005/0286668 A1 * | 12/2005 | Kubin | H03H 17/0223 |
| | | | 375/355 |

(Continued)

OTHER PUBLICATIONS

PCT/US2011/068265 Application filed on Dec. 31, 2011.

(Continued)

*Primary Examiner* — Kevin Mew
(74) *Attorney, Agent, or Firm* — Eschweiler & Potashnik, LLC

(57) ABSTRACT

A polynomial kernel generator is configured to mitigate nonlinearity in a receiver path from a transmitter path comprising a nonlinear component in a communication device or system. The polynomial kernel generator operates to generate polynomial kernels that can be utilized to model the nonlinearity as a function of a piecewise polynomial approximation applied to a nonlinear function of the nonlinearity. The polynomial kernel generator generates kernels in a multiplier less architecture with polynomial computations in a log domain using a fixed number of adders.

22 Claims, 10 Drawing Sheets

(56) References Cited

U.S. PATENT DOCUMENTS

| | | | | |
|---|---|---|---|---|
| 2009/0116664 A1* | 5/2009 | Smirnov | ............ | H04R 3/00 381/106 |
| 2009/0185613 A1* | 7/2009 | Agazzi | ............ | H03M 1/0626 375/232 |
| 2010/0135449 A1* | 6/2010 | Row | ............ | H04B 1/1638 375/371 |
| 2011/0268226 A1* | 11/2011 | Lozhkin | ............ | H03F 1/3247 375/296 |
| 2012/0295558 A1* | 11/2012 | Wang | ............ | H04B 1/109 455/79 |
| 2013/0044791 A1* | 2/2013 | Rimini | ............ | H04B 1/109 375/219 |
| 2015/0236750 A1* | 8/2015 | Choi | ............ | H04B 1/525 370/278 |
| 2015/0311929 A1* | 10/2015 | Carbone | ............ | H04B 1/1027 455/78 |
| 2015/0341125 A1* | 11/2015 | Bharadia | ............ | H04B 1/00 370/277 |
| 2016/0072649 A1* | 3/2016 | Tu | ............ | G06N 3/04 375/346 |
| 2016/0182104 A1* | 6/2016 | Xue | ............ | H04J 11/0056 455/78 |
| 2016/0261297 A1* | 9/2016 | Heinikoski | ............ | H04B 1/1027 |
| 2016/0294425 A1* | 10/2016 | Hwang | ............ | H04B 1/525 |

OTHER PUBLICATIONS

PCT/US2011/068265 Drawings filed on Dec. 31, 2011.
Esmaeeli, Siamak et al. "Reduced Memory Requirement in Hardware Implementation of SVM Classifiers." 20th Iranian Conference on Electrical Engineering, (ICEE2012), May 15-17, 2012, Tehran, Iran. pp. 46-50.
Gustafsson, Oscar et al. "Multiplierless Piecewise Linear Approximation of Elementary Functions." Signals, Systems and Computers, 2006, ACSSC '06. Fortieth Asiloma R Conference On, IEEE, PI, Oct. 1, 2006, pp. 1678-1681.
European Search Report, Application No. 16170241.0-1874, dated Oct. 25, 2016.

* cited by examiner

ENERGY EFFICIENT POLYNOMIAL KERNEL GENERATION IN FULL-DUPLEX RADIO COMMUNICATION

FIELD

The present disclosure relates to generating a polynomial kernel, and more specifically, generating a polynomial kernel for more energy efficient full-duplex radio communication.

BACKGROUND

Nonlinearity is inherent in most systems confronting scientific endeavors, and presents particular challenges to a wide array of scientific fields. The behavior of a nonlinear system is often described by a nonlinear system of equations. A nonlinear system of equations is a set of simultaneous equations, in which the unknowns (or the unknown functions in the case of differential equations) appear as variables of a polynomial of degree higher than one. In other words, in a nonlinear system of equations, the equation(s) to be solved cannot be written as a linear combination of the unknown variables or functions that appear in it (them). Because nonlinear equations are difficult to solve, nonlinear systems are commonly approximated by linear equations (linearization).

A nonlinear system of equations, or nonlinearity, applies to nonlinear digital pre- or post-distortion schemes of nonlinear components or nonlinear systems with memory, such as power amplifiers for wireless-, wireline-, or optical-fiber-communication. Primary problems caused by system components exhibiting dynamic nonlinearity (i.e. nonlinear behavior with memory) are out-of-band emissions and in-band distortion, which lead to design problems such as low energy efficiency and degraded performance. Non-linear pre- or post-distortion schemes or combinations thereof attempt to mitigate the unwanted effects resulting from out-of-band emissions and in-band distortion by attempting to modify (pre- or post-distorting) input or output signals of nonlinear systems.

Interference cancellation can be a key enabler of full-duplex radio communication. One particular type of interference is known as 'self-interference,' which refers to interference from the one signal pathway on to another. Self-interference cancellation can enable lower cost components to be integrated in a transceiver, for example, by relaxing the requirements on expensive duplexers, thereby saving billions of dollars in mass produced transceivers for FDD and full-duplex radios. Self-interference cancellation techniques that are implemented in the digital domain can potentially cancel up to 20-25 dB of interference.

DETAILED DESCRIPTION

Figure 1:
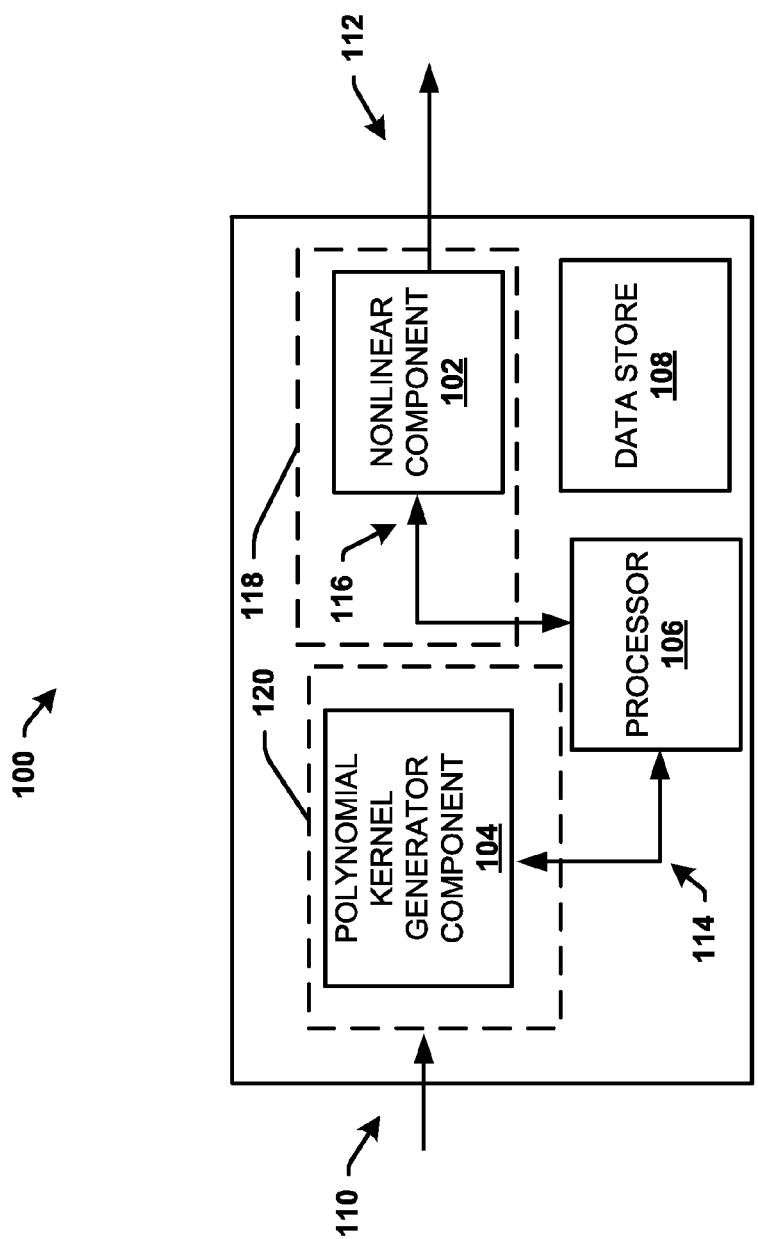
FIG. 1 is a block diagram illustrating a nonlinear system for eliminating nonlinear distortion according to various aspects described.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies of nonlinear devices or systems, various aspects for mitigating the nonlinearity of different nonlinear components (e.g., power amplifiers, all-digital or analog transmit or receive chain components, hybrid digital and analog components, multi-input-multi-output (MIMO) components or other nonlinear devices) are disclosed. In particular, nonlinearities can exist in the transmit paths of communication devices that carry over and cause self-interference within the receiver path of the same communication device, especially when the transmit path or components therein operate at a higher power level within the same communication device than the receive path or receive components therein. The converse condition could also be true, in which the receive path is also conceivably able to cause self-interference that affects the transmit path. The self-interference nonlinearities caused by one signalling path (e.g., the transmit path or transmitter component) to another signalling path (e.g., a receive path or a receiver component), for example, can be modeled as a function of one or more polynomial kernels.

Various processes involving machine learning, for example, can be applied to model and characterize the nonlinearities causing self-interference with polynomial kernels. Various polynomial techniques, for example, can be utilized for a generalization of linear adaptive filtering, such as the so-called polynomial kernel method, or other techniques, which can transform nonlinear data streams to a high-dimensional feature space for a segmented generalization of linear adaptive filtering, for example. However, polynomial expansions of a complex signal (e.g., the receiver input signal with self-interference thereat) can involve high computational complexity and large area/power costs in a hardware implementation, rendering an accurate and realistic hardware realization difficult when faced with tight power/area constraints on a user device (e.g., a mobile/wireless device, a user equipment, a graphics device, etc.). Moreover, a fully configurable architecture could be further utilized to satisfy diverse simulation and modeling architectures, incurring further implementation cost.

In one solution proposed, a polynomial kernel generator component disclosed herein generates polynomial kernels, which can operate with polynomial approximations (e.g., piecewise polynomial approximation or the like) to cancel nonlinear transmitter interference, which is present in the receive path. The polynomial kernel generator component is designed to be a multiplier-less (without a multiplier or multiplication element in the configuration), have logarithmic components for performing logarithmic computations on complex input signals or complex input components (e.g., quadrature and in-phase components (I/Q)), and generate the kernels with approximately three adders. The parameter "K" refers to the number of kernels utilized to model the nonlinearities originating in a signal processing path such as the transmit path or stream. In addition, a scheduling component of the polynomial kernel generator is configured to perform scheduling of these three adders in the core calculation for a polynomial kernel. The polynomial kernel generator component achieves a K+1 cycle delay under the designated clock frequency.

An advantage of the polynomial kernel generator component architectures being disclosed is that it can operate to provide a more highly efficient realistic hardware realization of a configurable polynomial kernel generation for nonlinear modeling of transmit signals. The polynomial kernel generator component can be used in an all-digital implementation of self-interference cancellation in full-duplex or FDD radio communication systems or device (e.g., transceivers or the like). Compared to other hardware realizations for mitigating or eliminating self-interference in a communication device (e.g., user equipment, a transceiver, or other such device), the embodiments disclosed provide a more elegant or space saving, energy-efficient FPGA or ASIC implementations of fast polynomial kernel generation. As such, the proposed solutions of this disclosure serve as an energy- and area efficient hardware implementation to address this potentially complex nonlinearity modeling problems, such as by a hardware realization of the polynomial kernel generator component as a fast multiplier-less, logarithm-based, complex signal input polynomial kernel generator. The polynomial kernel generator component can be configured as a K-stage general pipelined complex (I/Q) parallel output architecture with full support and configurability in the field for multi-kernels. Additional aspects and details of the disclosure are further described below with reference to figures.

FIG. 1 illustrates an overview example for disclosure of a nonlinear communication system or device 100 (e.g., a transceiver, a mobile/wireless communication device, or the like) having full-duplex communication capabilities according to various aspects. Full-duplex communication can be referred to as communicating at the same time, concurrently, at about the same time or simultaneously in at least two different directions, such as by transmitting and receiving communication data. The system 100 comprises a transmitter 118 having a transmit path (processing chain) 116 with the nonlinear component 102, which generates nonlinearities or nonlinear characteristics during operation or at a transmit output 112. The system 100 further comprises a receiver 120 with a polynomial kernel generator component 104, which operates to generate an output signal and improve the output of the receiver processing chain 114 with more desirable properties by canceling or eliminating at least a portion of nonlinearity that interferes with the receiver 120 from the transmitter 118, known as self-interference.

Figure 2:
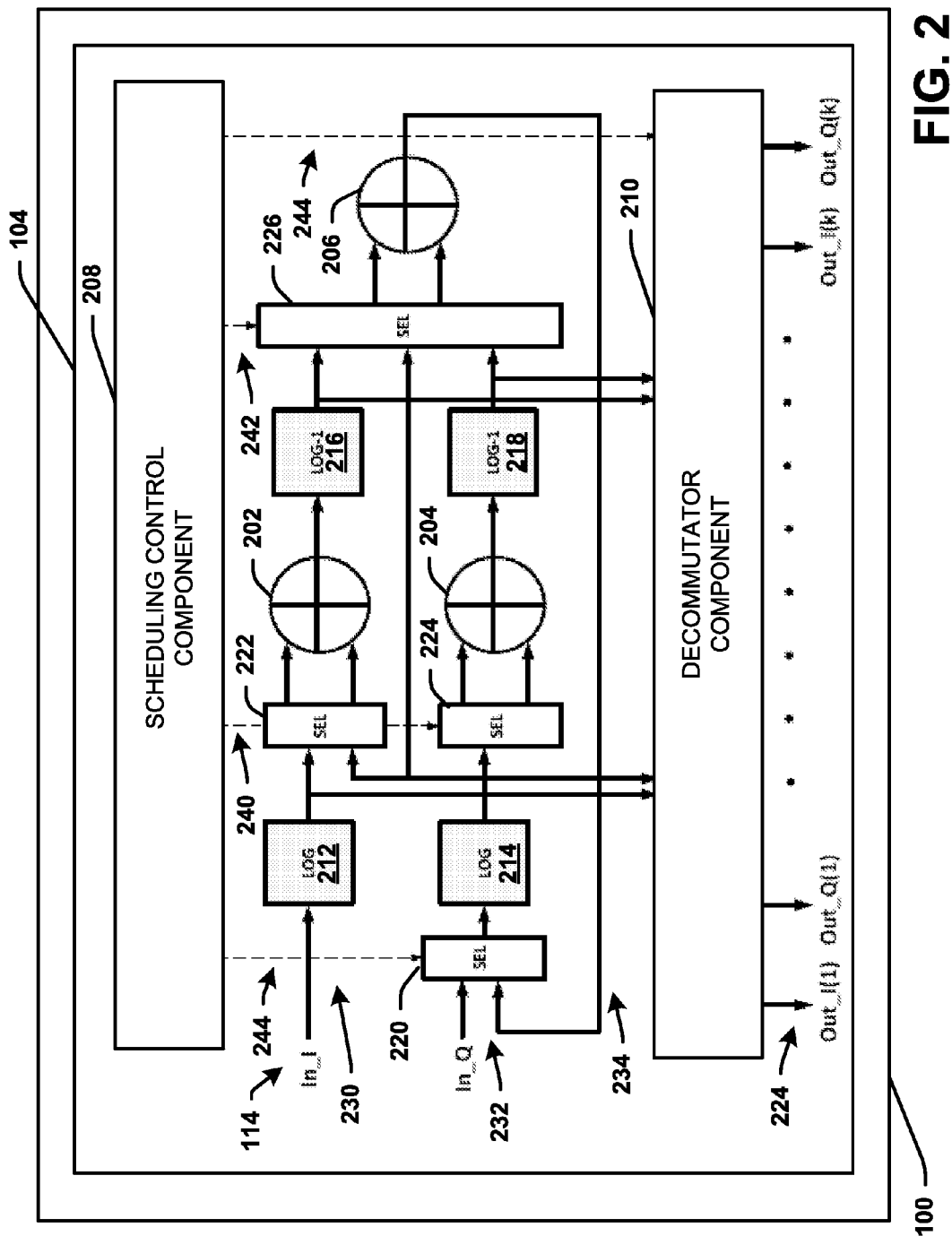
FIG. 2 is an example of a polynomial kernel generator component in accordance with various aspects described.

The nonlinear component 102 (e.g., a power amplifier or other power consuming component) of the transmitter 118, for example, can operate at a higher power level than the receiver 120, which, in turn causes the self-interference into other signal paths (e.g., the receiver path or chain). As such, a difference in power consumption between the transmitter 118 and the receiver 120 causes nonlinearities (self-interference) that affects the receiver chain processing of the receiver 120 within the same communication device or system 100. The polynomial kernel generator component 104 generates one or more polynomial kernels to mitigate or cancel the self-interference spilling over into the receiver 120 from the transmitter by utilizing three adders (as illustrated in FIG. 2, as adders 202, 204, 206) and independent of (without) any multipliers elements. For example, the polynomial kernel generator component 104 generates polynomial kernels that can be used in a polynomial approximation (e.g., a piecewise polynomial approximation) to cancel the self-interference caused by the nonlinearity of the transmitter 118 that is affecting the receiver 120 with any number of polynomial kernels, which can dynamically or on the fly change in real time in number, without multipliers and based on a fixed number of adders (e.g., three or the other number).

The term polynomial kernel as used herein can refer to a kernel function that can be used with support vector machines (SVMs) or other kernelized models (e.g., a polynomial kernel method) being applied to signal processing chains (e.g., the receiver chain 114), which are configured to transform nonlinear data streams to a high-dimensional feature space for linear adaptive filtering, for example. The polynomial kernel (or kernel) can be a data function of similarity of vectors (e.g., training samples) in a feature space over polynomials of original variables or input parameters, which enable learning of or modeling of the non-linear behavior from the transmit path 116. The polynomial kernel can identify similarities of given features or properties of input samples (e.g., as complex input I/Q components and interference therein), but also combinations of signal properties. The feature space of a polynomial kernel can be equivalent or similar, for example, to that of a polynomial regression without a large blow up in the number of parameters to be learned or modeled. When input features are binary-valued (Booleans), then the features can correspond to logical conjunctions of input features, for example.

In one aspect, the communication device or system 100 can comprise an all-digital device or transceiver so that the nonlinear component 102 and all other components can comprise all digital components. For example, the system 100 can comprise the transmitter 118 with a transmitter processing chain 116 and the receiver 120 with a transmitter processing chain 114 having digital components with a digital receiver processing chain 114. The transmitter processing chain 116 and the receiver processing chain 114 can be coupled to one or more different processors or the same processor 106 (e.g., a digital signal processor, microcontroller, or other processing device), for example, as illustrated in FIG. 1, but is not limited to any one particular configured as one of ordinary skill in the art could appreciate.

The communication device or system 100 with the nonlinear component 102 can exhibit or generate different degradation elements such as nonlinearity distortion, linear distortion, or a memory effect, in which the nonlinearity distortion and the memory effect can be referred herein as nonlinearity or dynamic nonlinearity and the nonlinear behavior can be described according to one or more nonlinearity functions. Specifically, the nonlinear distortion refers to a waveform distortion caused by nonlinear characteristics of a system, device circuit or component (e.g., a power amplifier) with respect to an input or input amplitude, such as AM (amplitude modulation) AM and AM-PM (phase modulation) characteristics. Linear distortion can refer to the waveform distortion caused by linear frequency characteristics of the circuit (frequency characteristics appearing in a signal component), and the memory effect refers to the waveform distortion caused by a mutual relation between the nonlinear characteristics of the nonlinear component 102 and various frequency characteristics of the system 100 (frequency characteristics appearing in a distortion component). In a simple amplifier model, for example, utilizing only the nonlinear distortion (AM-AM and AM-PM characteristics), an output of the amplifier or of the nonlinear component 102 can be uniquely determined by the current input 110. However, when the linear distortion or the memory effect is present, in terms of a time domain, the output of the amplifier can be related, not only to the current input, but also to a previous input, previous state, and/or a previous output of the amplifier.

The system 100 further comprises the polynomial kernel generator component 104 as a part the receiver 120 or receiver path 114, a processor 106 and a data store 108. The polynomial kernel generator 104 can operate to decrease the nonlinearity exhibited by the nonlinear component or device 102 by modeling or generating a number of kernels that can model the nonlinearity of the nonlinear component 102. The nonlinear model, for example, can be generated based on a polynomial approximation, such as a piecewise polynomial approximation based on the polynomial kernels being generated.

Referring to FIG. 2 illustrated is an example architecture of the polynomial kernel generator component 104 comprises by a communication device 100, such as a mobile/wireless communication device, a transceiver or other communication device that is configured to operate in FDD or a full-duplex mode of communication. The polynomial kernel generator component 104 comprises adders 202, 204, 206, a scheduling controller component 208, a decommutator component 210, log components 212, 214, select components 220, 222, 224, 226 and anti-log components 216, 218, as an example architecture.

The example architecture of the polynomial kernel generator component 104 provides a multiplier-less (without any multiplier or multiplier component) approach to perform polynomial kernel generation. The polynomial kernel generator component 104 can perform polynomial computations in the log domain (e.g., base-2 log domain) via the log components 212 and 214 so that the power term can be converted to a constant multiplication equivalent without utilizing multipliers. For computing polynomial approximation, the base of the logarithmic computation can be the input signal power of the input signals 114 (as I/Q signals), which can be processed as a multicycle addition to generate the polynomial kernels 224 as outputs of the polynomial kernel generator component 104.

The scheduling control component 208 provides scheduling and serialization for the input data of signal processing chains 230 and 232, which correspond respectively to the processing of a first input signal component (IN_I) and a second input signal component (IN_Q). The scheduling control component 208 can enable only a fixed number of adders (e.g., three) as part of the core calculation in generating polynomial kernel outputs to a decommutator component 210. Based on a degree of the polynomial, or the highest power for polynomial modeling that is related to the presently detected self-interference in the signal processing paths 230, 232 from the transmitter 118 or transmit path 116 of FIG. 1, each iteration of signal processing along the signal processing chains can generate a different polynomial kernel for polynomial modeling processes. The scheduling component 208, for example, can include a finite state machine (FSM) that operates with a finite number of states that can be used to provide a select signal to the select components 220, 222, 224, 226 (e.g., multiplexer(s), selection filter(s), or the like) and the decommutator 210 (e.g., a demultiplexer, parallel signal generator, or the like), which, in turn, indicates when or which outputs will be processed downstream. The decommutator 210 then accumulates or stores each kernel from the signal processing chains 230 and 232 at one or more points along the chains and outputs the polynomial kernels in parallel as outputs 224. Therefore, the decommutator 210 can perform a serial to parallel conversion to concurrently output all K kernels in parallel or each kernel in the in phase and quadrature components together.

In another aspect, the signal processing path 230 comprises an in-phase component of an input signal that can be affected by self-interference therein, such as from the non-linear behavior of the transmitter 118 or transmit path 116 of FIG. 1. The input In_I is received by the log component 212 that generates a logarithmic computation that converts the In_I into a log domain (e.g., as a base-2 log, or other base log). The log component 212 is coupled to the select component 222, which receives the logarithmic computational result at a first select input connection connected to the log component 212 and the select component 222. The select component 222 additionally receives a select signal from the scheduling control component 208 via select path 240, which schedules one or more different inputs to be provided downstream to the adder 222. The select component 222 is also coupled to a feedback path 224 to receive a feedback signal output from a third adder 206. The select component 222 thus utilizes the select signal, the input signal and the feedback signal to generate inputs at a plurality of processing paths to the first adder 202.

The signal processing path 230 further includes a first anti-log component 216 that converts the result of the adder 202 into a fixed point number from a logarithmic number. The result of the anti-log component 216 is provided to the decommutator 224 as a polynomial kernel and to an additional select component 226 configured to operate similarly as the select component 222 by generating input signals to the adder 206 based on an anti-log input, the feedback signal of feedback path 234, a select signal via select path 242, as well as an input signal from the second signal processing path 232 of a processed input signal In_Q.

The second signal processing path 232 has similar components and functions as the signal processing path 230. A first select component 220 initially receives the input In_Q and the feedback signal via the feedback path 234 and generates inputs based on a FSM state of the scheduling control component 208 for a given kernel iteration or cycle of kernel generation through the signal processing chains 230 and 232. A total cycle delay to generate a number of K kernels, in which K is a positive integer, for example, is K+1. The polynomial kernel generator component 104 thus comprises a total cycle delay regardless of the degree of the polynomial approximation technique utilized to model self-interference, or, in other words the number K, which could vary dynamically based on the degree of the polynomial modeling, or the self-interference being detected.

The select component 220 is coupled to the log component 214 and provides one or more inputs to the log component 214 based on the feedback signal of the feedback path 234 feeding into the signal processing chain 232 and an input (In_Q). Outputs of each log component 212 and 214 can be provided to the decommutator component 210, for example, as polynomial kernels in a log domain. The select component 224 further provides inputs to the second adder 204 based on a select signal via select path 246 from the scheduling control component 208 and one or more input signals thereat. The select component 224 can also receive the feedback signal via a feedback path 234 connected to the output of the third adder 206 or a combiner of the outputs of both signal processing chains 230 and 232, which can also be used to configure what inputs are provided to the adder 204 along with the logarithmic output of the log component 214, and the select signal. The second adder 204 then combines the inputs and outputs them as a logarithmic input to the anti-log component 218, which further converts the logarithmic result to a fixed point number to the select component 226. The outputs of the anti-log components 216 and 218 can further be provided to the decommutator component 210 as fixed point kernels.

In one embodiment, the polynomial kernel generator component 104 can be configured as an integrated circuit (e.g., an applied-specific integrated circuit (ASIC), field-programmable gate array (FPGA), or other processing device configured to generate kernels for polynomial modeling self-interference within a receiver caused by a transmitter in the same device. The polynomial kernel generator component 104 has an advantage of being able to accommodate complex (I/Q) signals while dynamically extending or processing different numbers of kernels or levels of kernels for nonlinear modeling depending on one or more criteria/properties identified in the nonlinearity or the particular polynomial modeling degree being set to model the nonlinearity or self-interference.

The input I/Q signals 114 (In_I, In_Q) are the sample input signals (I/Q) from a transmitter data path. The polynomial kernel generator component 104 can operate to sample the inputs at defined sample time intervals and generate the desired kernel outputs (I/Q) in a given delay cycle. The outputs are stored in the decommutator 210, where it then generates all parallel outputs at the end of the kernel calculation or based on the select signal indicating the end. Detailed equations demonstrating the kernel generation are shown in Eq.1-Eq.3 below.

def:signalIn=x+jy, wherein each input signal (signalIn) as (I/Q) can comprise a real component (x) and an imaginary component (jy) in the definition;

def:signalOut(k)=out$_I$(k)+out$_Q$(k), wherein the definition of the output signal can include outputs for each signal component (I/Q) and can also each be defined as a complex number with a real and an imaginary component as well. The following equations demonstrate the operations generated by the various components of the polynomial kernel generator component 104 based on these definitions:

$$signalOut(k) = signalIn \mid signalIn \mid^{k-1} = (x+jy) \cdot \left(\sqrt{x^2+y^2}\right)^{k-1}; \quad \text{(Eq. 1)}$$

$$\begin{cases} x^2 = \log^{-1}(2\log x) = \log^{-1}(\log x + \log x) \\ y^2 = \log^{-1}(2\log y) = \log^{-1}(\log y + \log y) \end{cases}; \quad \text{(Eq. 2)}$$

$$\log(signalOut) = \begin{cases} \log x + (k-1)/2 \cdot \log(x^2+y^2) \\ \log y + (k-1)/2 \cdot \log(x^2+y^2) \end{cases} \quad \text{(Eq. 3)}$$

$$= \begin{cases} \log x + [(k-1) \cdot \log(x^2+y^2)] >> 2 \\ \log y + [(k-1) \cdot \log(x^2+y^2)] >> 2 \end{cases}$$

$$\xrightarrow{\log^{-1}} out_I(k) + out_Q(k)$$

By taking the logarithm of the original equations as defined for SignalOut, the above derivation enables the original power term to be transformed into a single constant multiplication term effectively. Where the signal power could also be obtained by taking the individual log and adding up the real and imaginary parts. The difference between each kernel is K−1 multiplied by the log of signal power, thus the constant multiplication is simplified to an addition of the same term accumulated over each cycle delay, as utilized via the adders 202, 204 and 206.

Figure 3:
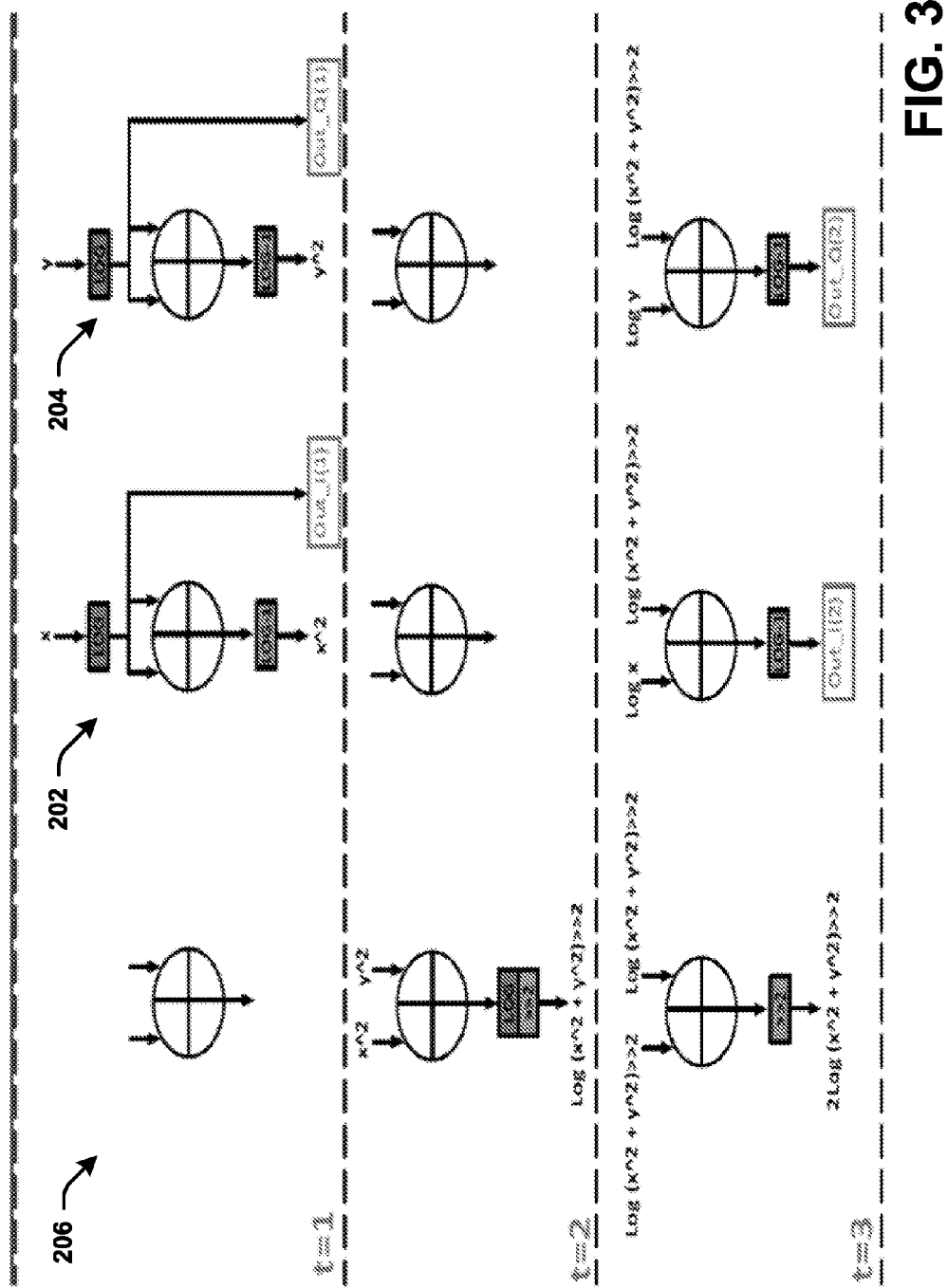
FIG. 3 is a block illustrating a setup stages for a scheduling control component in accordance with various aspects described.

Referring to FIG. 3, illustrated is an example of a scheduling diagram for K=5 polynomial kernels in accordance with various aspects being described. The three adders 202, 204, and 206 are illustrated at clock cycles t=1, 2 and 3, in which the polynomial kernels are outputted in a log domain, or a fixed point domain depending upon a state of an FSM in the scheduling control component 208 and the select signal via one or more paths 240, 242, 244. Although five kernels are illustrated in FIG. 3 to illustrate the inputs and outputs to the adders 202, 204, and 206, other number of kernels (e.g., 7, 11, etc.) can also be generated with a clock cycle time as K+1. The polynomial kernel generator component 104 is thus capable of generating a polynomial kernel in a single clock cycle, and all kernels for a given polynomial degree in K+1. Therefore, if eleven polynomial kernels are determined to more closely model a given self-interference, then all eleven kernels would take twelve cycles, for example, in which one tick of a clock (not shown) is a cycle.

FIG. 3 illustrates an example representation of the finite states of the scheduling control component 208. At clock tick one, t=1, the computations are performed basically using the three adders 202, 204, and 206, in which one of the adders is not being used. At clock tick two, t=2, the adder (e.g., adder 206) can provide an output to a log component in order to provide the data in the log domain as well as a shifter to shift the logarithmic output. At clock tick three, t=3, all three adders 202, 204, 206 are activated for use by the select signal.

Figure 4:
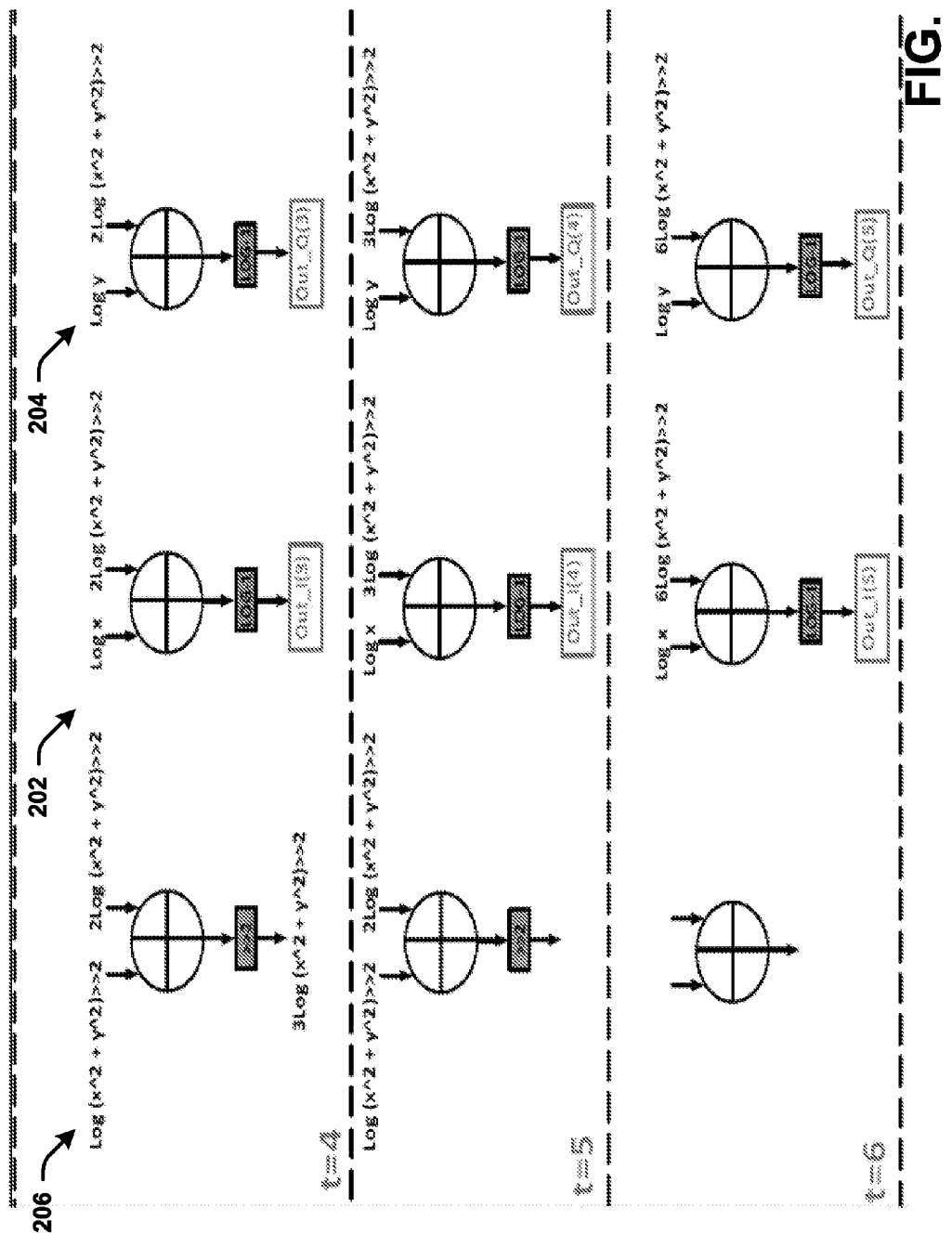
FIG. 4 is another block illustrating a setup stages for a scheduling control component in accordance with various aspects described.

FIG. 4 illustrates the clock signals, inputs and outputs at clock ticks four, t=4, in which all three adders 202, 204, and 206 are being utilized. Further, at clock tick five, t=5, all three adders are also being utilized or activated for kernel generation. At clock tick six, t=6, or at the last kernel, two adders are activated for the quadrature and in-phase component kernels. After clock tick six all five kernels are generated to be provided as outputs for further modelling in a degree of five polynomial modeling.

Figure 5:
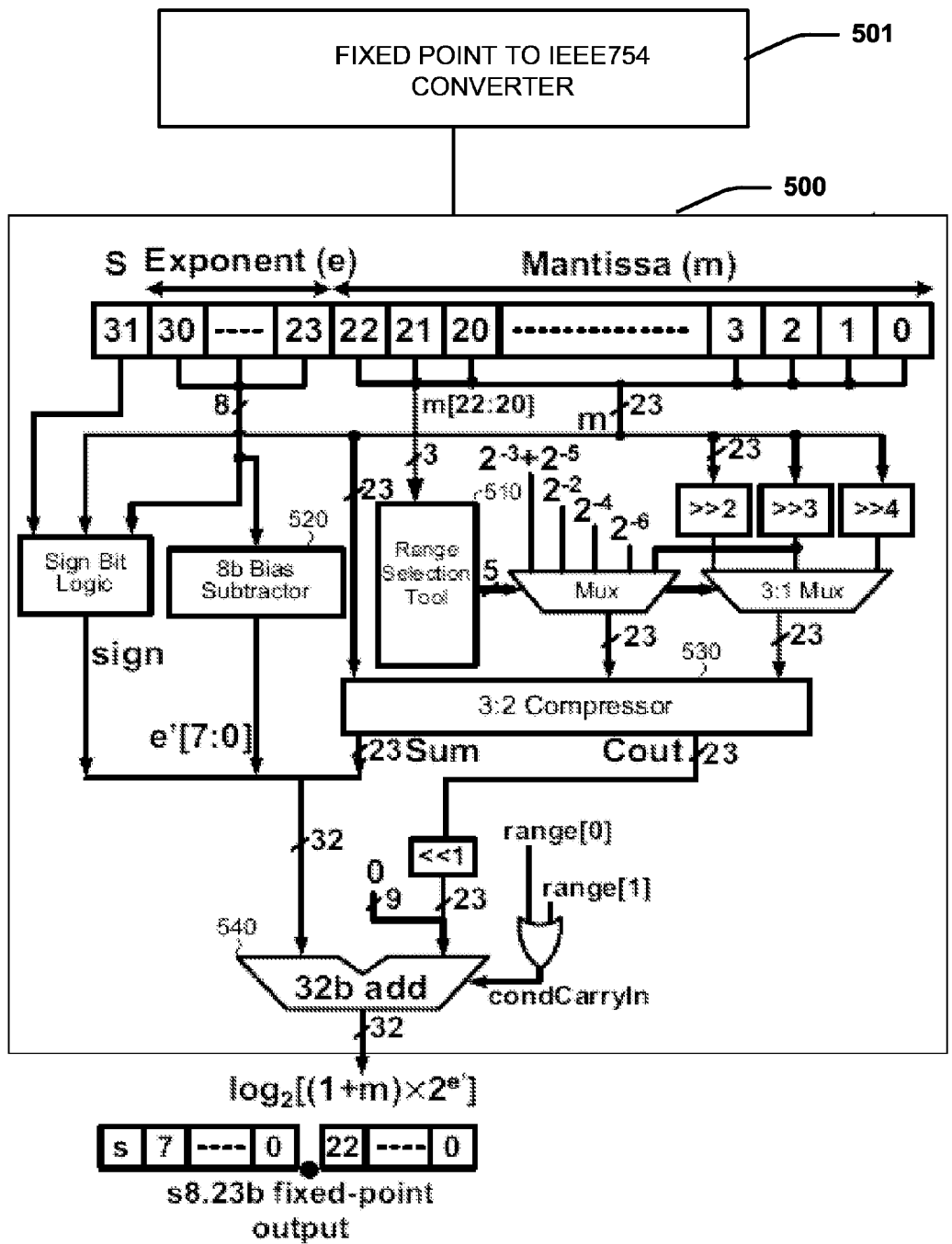
FIG. 5 is a block diagram of a log component and a converter block in accordance with various aspects described.

Referring now to FIG. 5, illustrated is an example of a log component 500 as an example of log component 212 or 214 of FIG. 2 in accordance with various aspects being described herein. As described above, the computation in the fixed data path or signal processing chains 230 or 232 can be performed using fixed point arithmetic. The output of the log processor 500 can produce fixed point numbers for processing based on inputs being received from a fixed point to IEEE754 converter 501 that converts a fixed point input to an IEEE754 protocol. The fixed point converter 501, for example, can receive a ten bit number and generate a 32 bit floating point number, which can then be input into the log component 500. Alternatively, the fixed point converter 501 can be eliminated in the architecture to further accommodate floating point kernel generation, in which the inputs to the polynomial kernel generator component 104 can be floating point numbers. The disclosure is not limited to fixed point computations in the kernel generation processes, but for energy-efficiency reasons, fixed point inputs can also be utilized by the polynomial kernel generator component 104.

As illustrated in the bottom of FIG. 5, the fixed point numbers are represented as a 32-bit number with the most significant bit representing the sign, the next 8 bits representing an integer, and remaining 23 bits representing the fractional portion. Fixed-point computation reduces power and improves performance in the polynomial kernel generator component 104 of FIG. 2. The log component 500 includes range selection logic 510 (e.g., ranges illustrated in FIG. 7) which uses the upper three bits of the mantissa of the input single precision number to determine which linear equation is to be used, as described below. The output of the range selection 510 logic is used to select the appropriate constants and coefficients for the particulars of the equations (as further illustrated in FIG. 7) above being used, based on a portion of the mantissa value. The range selection 510 reviews the MSBs of the mantissa, and then selects an appropriate linear equation for a log approximation using various ranges (e.g., ranges illustrated in FIG. 7). A bias from the exponent of the single precision is first removed by adding it to −127 (0x81 is the hexadecimal representation), which is implemented by an incrementing block 520 and inversion of the Most Significant Bit (MSB). After the correct constants and coefficients are selected (as further illustrated in FIG. 7), the outputs are fed to a 3:2 compressor 530 and subsequent completion adder 540. The coefficients (as further illustrated in FIG. 7) can be bit-shifts of the mantissa portion by a set number of bits depending on which interval the mantissa portion is a member of.

Computing exponentiation in the log domain results in a simple multiplication at the expense of accuracy. The error is minimized if the number that is input to the log component 500 is between 0 and 1, and can be computed quite quickly using a set of linear intervals. Embodiments of the disclosure use log arithmetic to compute the exponentiation in the log components 212 or 214 using a base-2 log unit that is implemented using linear interpolation. Since the number input to the base-2 logarithm is between 0 and 1, the accuracy of the computation is mostly retained.

Figure 6:
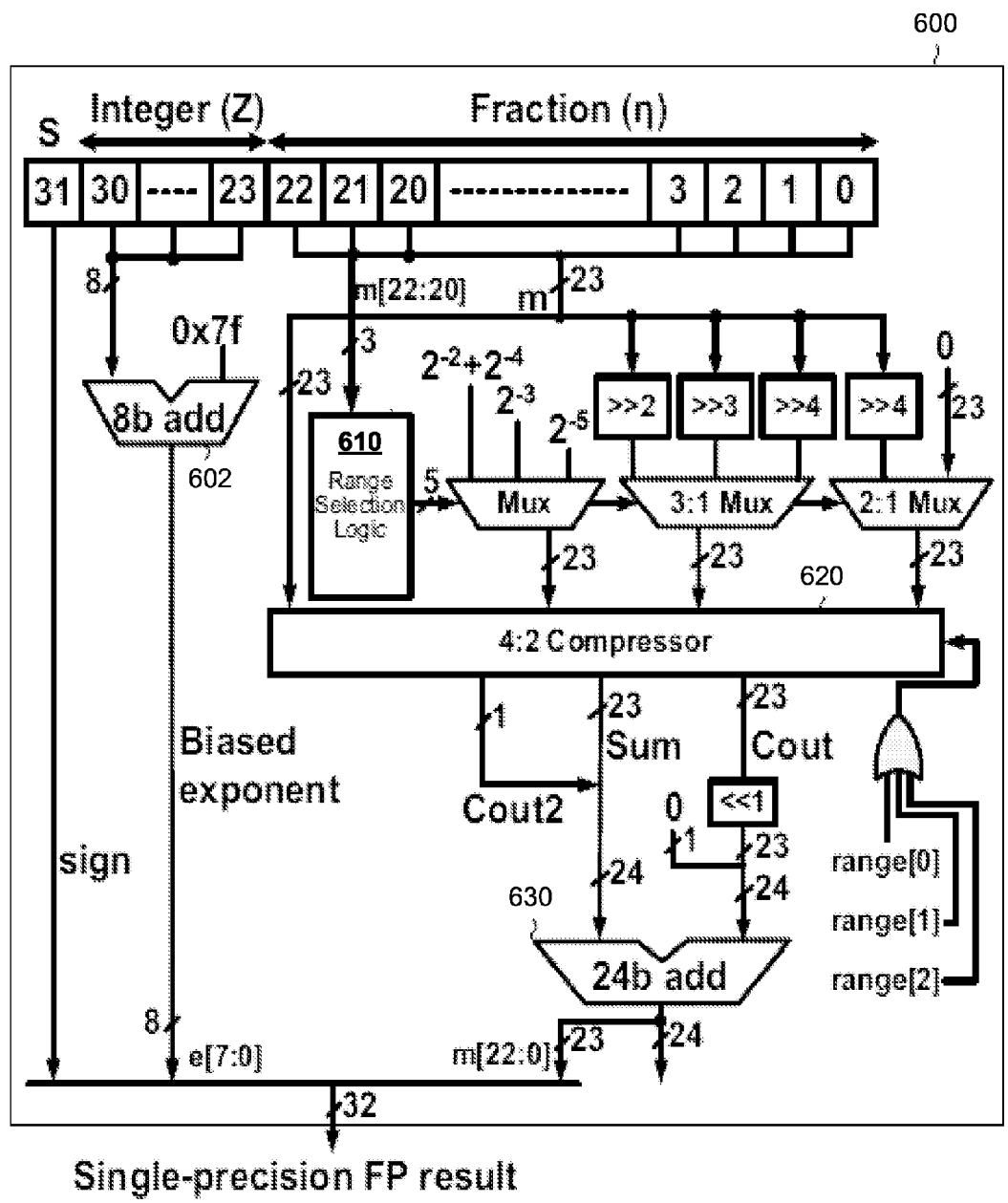
FIG. 6 is a block diagram of an anti-log component and a converter block in accordance with various aspects described.

Referring to FIG. 6, illustrated is an example of an anti-log component 600 that can be configured as the anti-log component 216 or 218 of FIG. 2. The anti-log processor 600 can receive as input a 32-bit fixed point representation. The anti-log processor approximates the mantissa portion of the single precision output using linear interpolation with a group of intervals (e.g., four intervals).

The exponent for the resulting single precision number is computed by adding 127 (0x7F) to the 8 bits representing the integer portion of the fixed point input to obtain the biased negative exponent in an adder 602. The mantissa portion is computed by linear interpolation as shown in the equations and using the various coefficients (as further illustrated in FIG. 7). These coefficients can be computed using bit-shifts of the fractional portion of the input fixed point number and the appropriate constants are selected based on range selection logic 610 (from range values of ranges illustrated in FIG. 7, for example), which may be the same or similar logic to the range shift logic 500 illustrated in FIG. 5. A 4:2 compressor 620 adds the four inputs before passing the resulting carry and sum to a 24b completion adder 630, for example. The completion adder 630 can be embodied by a quaternary tree adder, which can be a highly efficient adder.

Figure 7:
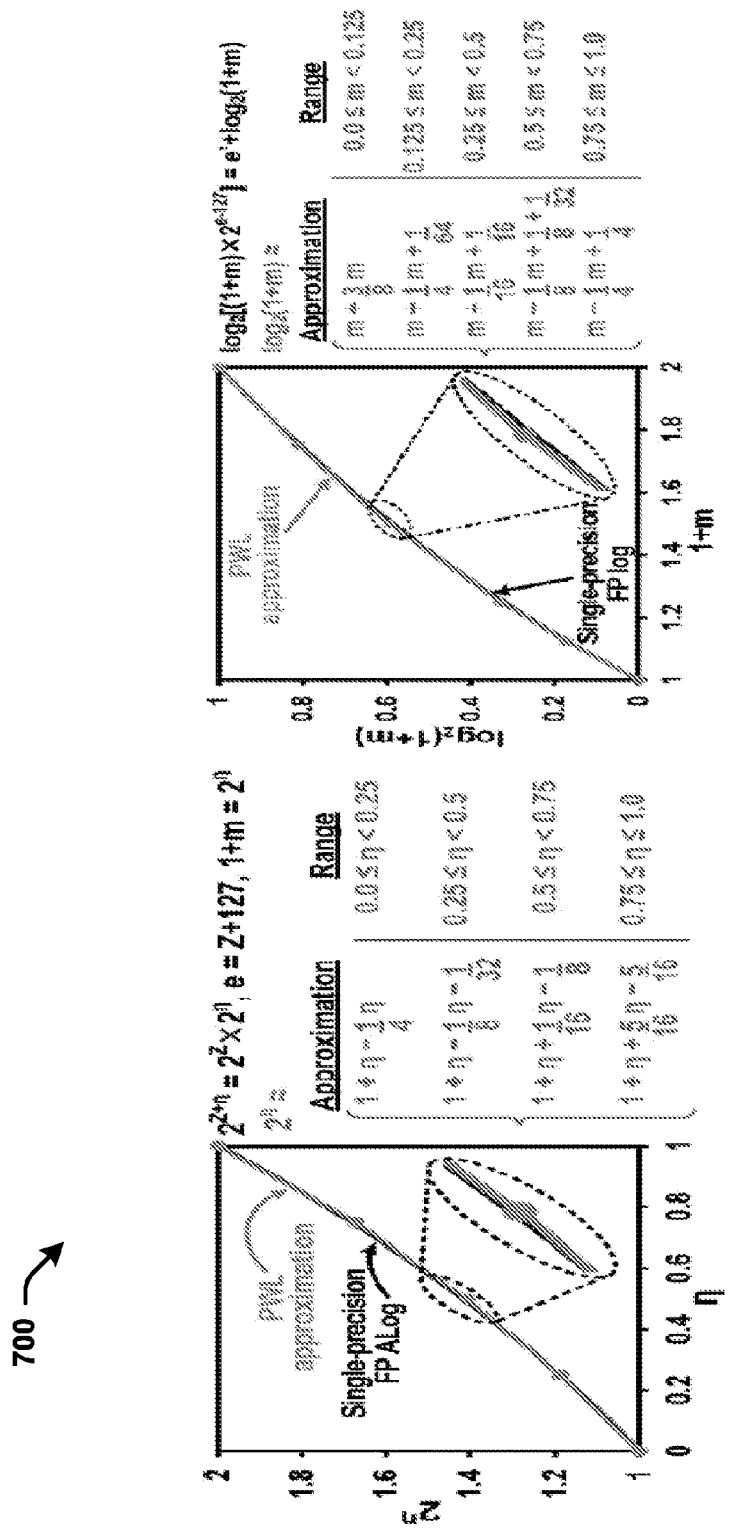
FIG. 7 is an example of piecewise linear approximations performed in log or anti-log components for generation of polynomial kernels.

Referring to FIG. 7, illustrated are approximation plots for logarithm components 212, 214 and anti-logarithm components 216, 218. The fixed point number can be processed through a conversion block (e.g., fixed point to IEEE754 converter 501), where inside the converter 501, a Priority Encoder can extract the sign, exponent, and mantissa of this number to match it to IEEE754 single precision standard. The logarithm components 212, 214 utilize a piece-wise linear approximation, for example, as illustrated in FIG. 7 for a base-2 logarithm calculation in the input range from 1 to 2, which essentially does an estimate for the logarithm of mantissa and adds the exponent back to obtain a fixed point approximation result. The piece-wise linear approximation achieves an average error of less than 0.76%, with a maximum error of 4.63% locating in the initial region.

Figure 8:
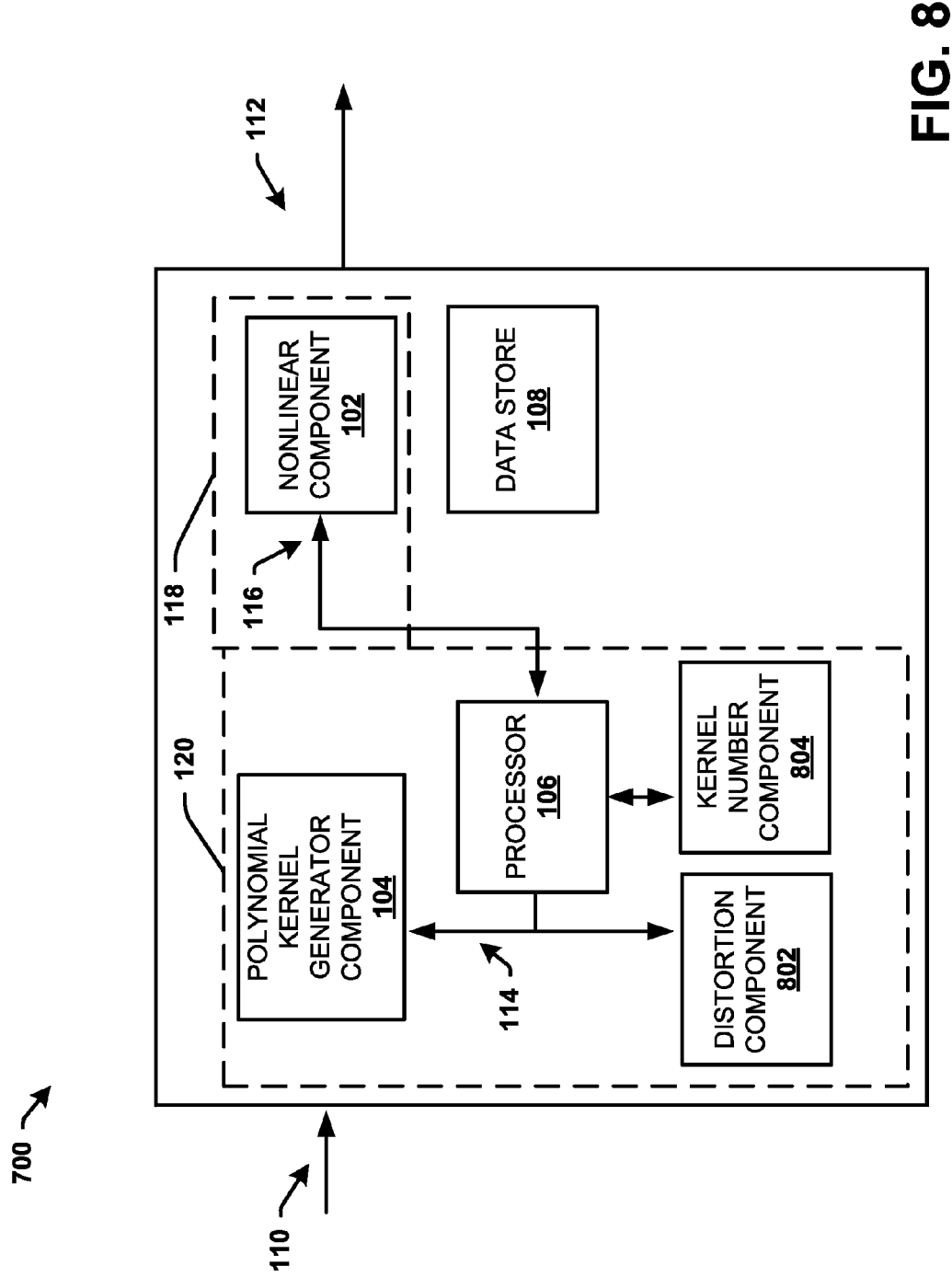
FIG. 8 is another block diagram illustrating a nonlinear system for eliminating nonlinear distortion according to various aspects described.

Referring to FIG. 8, illustrated is another example of a transceiver similar to FIG. 1 in accordance with various aspects disclosed. The receiver 120 further includes a distortion component 802 and a kernel number component 804. The distortion component 802 can be configured to generate a model of the nonlinear behavior with segmented polynomial approximations based on the plurality of kernels received. For example, a piecewise polynomial approximation can operate to generate a model of the nonlinearity detected within the receiver 120 caused by the greater power consumption of the transmitter 118. The nonlinearity can be dynamic, and thus the modelling degree could also be dynamic based on one or more properties of the nonlinearity signal being detected by the distortion component 802.

The kernel number component 804 is configured to determine a number of kernels that model the nonlinear behavior in order to generate a plurality of polynomials based on the number of kernels to linearly filter the self-interference based on a set of criteria related to an input component to the receiver 120. The kernel number component 804 can provide the number of kernels to be generated then to the polynomial kernel generator component 104, either via the receiver processor 106 or directly to the scheduling control component 208 of FIG. 2. The modeled nonlinearity can then be inversely applied as a pre-distortion, a post-distortion signal being received with the input signal 110, for example.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 9:
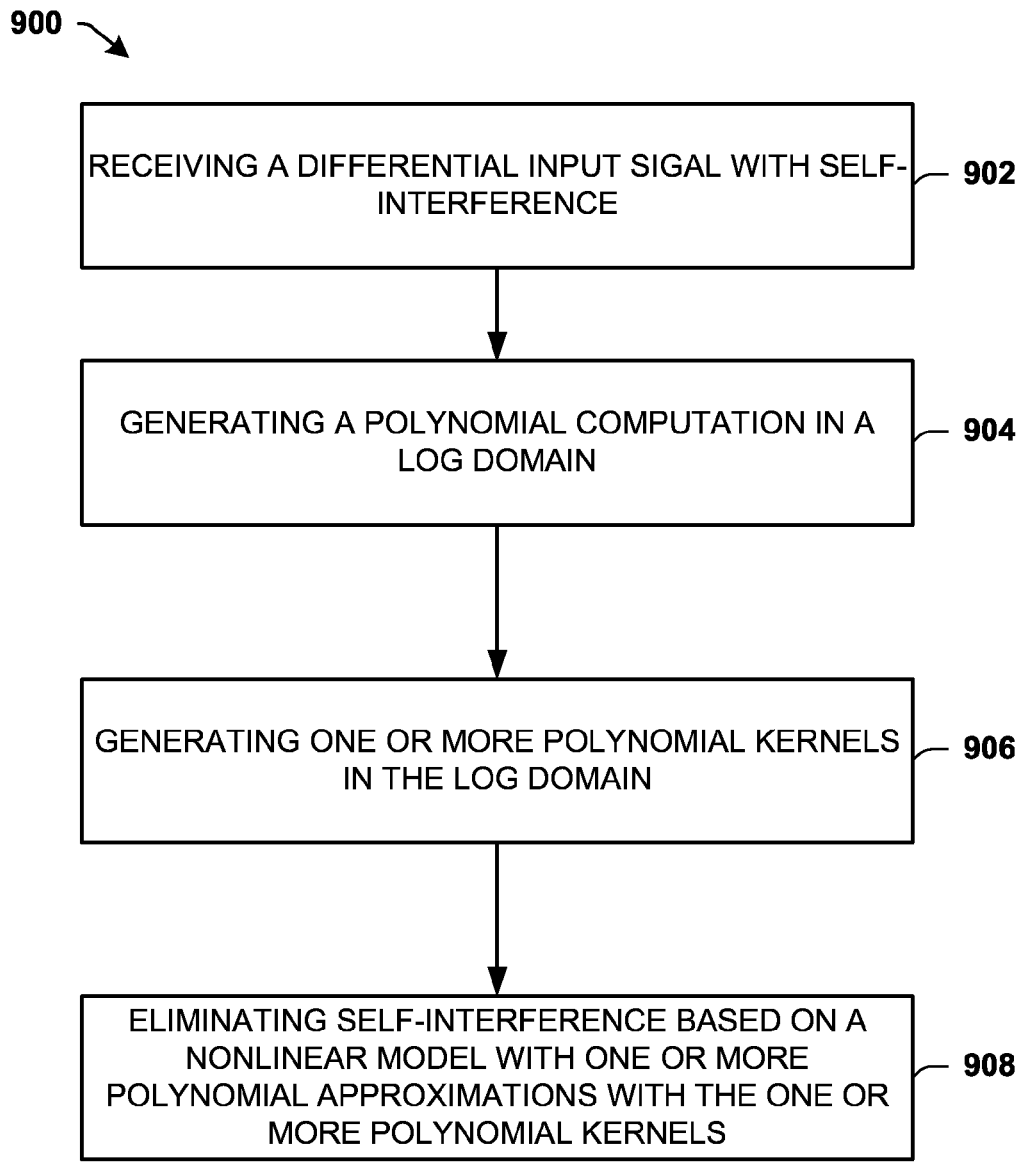
FIG. 9 is a flow diagram illustrating a method of mitigating nonlinear distortion according to various aspects described.

Referring to FIG. 9, illustrated is a method 900 for canceling self-interference in a full-duplex communication in a transceiver comprising a polynomial kernel generator (e.g., polynomial kernel generator component 104). The method initiates at 902 with receiving, via a receiver of the transceiver, a differential input signal comprising self-interference from a transmitter of the transceiver.

At 904, the method 900 comprises generating, via a controller, a polynomial computation in a log domain. For example, the generating the polynomial computation in the log domain can comprise performing a log of base 2 computation on the inputs (e.g., In_I, In_Q), which can be utilized to generate the kernels in the log domain for a piece-wise linear approximation.

At 906, one or more polynomial kernels are generated (e.g., via the polynomial kernel generator component 104) that enable modeling of the nonlinear behavior of the transmitter in the log domain.

At 909, the self-interference is eliminated (e.g., via the distortion component 702) from the transmitter within the receiver based on a nonlinear model with one or more piecewise polynomial approximations utilizing the one or more polynomial kernels.

The method can further comprise scheduling (e.g., via the scheduling control component 209) inputs based on the differential input signal to be selectively inputted into three adders of the receiver. In one aspect, the generating of the one or more polynomial kernels comprises generating outputs of the three adders to a decommutator (e.g., decommutator component 210) configured to provide a parallel output of the one or more polynomial kernels in K+1 clock cycles, wherein K comprises a number comprising a positive integer of the one or more polynomial kernels.

The method 900 can further include performing an anti-log computation of the polynomial computation in the log domain and providing a result of the anti-log computation to at least one adder configured to generate the one or more polynomial kernels in a receiver independent of a multiplication or a multiplier.

Figure 10:
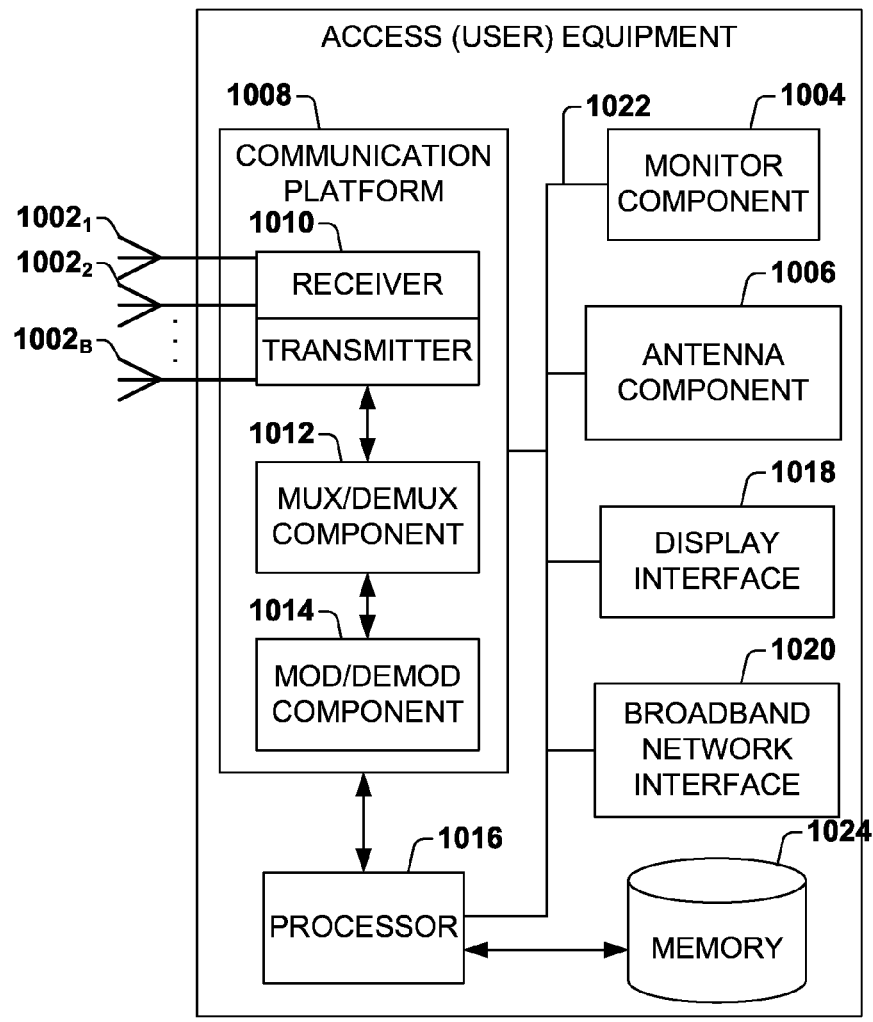
FIG. 10 is an example architecture of a user equipment for implementing various aspects described.

To provide further context for various aspects of the disclosed subject matter, FIG. 10 illustrates a block diagram of an embodiment of access (user) equipment related to access of a network (e.g., base station, wireless access point, femtocell access point, and so forth) that can enable and/or exploit features or aspects disclosed herein.

Access equipment, UE and/or software related to access of a network can receive and transmit signal(s) from and to wireless devices, wireless ports, wireless routers, etc. through segments $1002_1$-$1002_B$ (B is a positive integer). Segments $1002_1$-$1002_B$ can be internal and/or external to access equipment and/or software related to access of a network, and can be controlled by a monitor component 1004 and an antenna component 1006. Monitor component 1004 and antenna component 1006 can couple to communication platform 1008, which can include electronic components and associated circuitry that provide for processing and manipulation of received signal(s) and other signal(s) to be transmitted.

In an aspect, communication platform 1008 includes a receiver/transmitter 1010 that can convert analog signals to digital signals upon reception of the analog signals, and can convert digital signals to analog signals upon transmission. In addition, receiver/transmitter 1010 can divide a single data stream into multiple, parallel data streams, or perform the reciprocal operation. Coupled to receiver/transmitter 1010 can be a multiplexer/demultiplexer 1012 that can facilitate manipulation of signals in time and frequency space. Multiplexer/demultiplexer 1012 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 1012 can scramble and spread information (e.g., codes, according to substantially any code known in the art, such as Hadamard-Walsh codes, Baker codes, Kasami codes, polyphase codes, and so forth).

A modulator/demodulator 1014 is also a part of communication platform 1008, and can modulate information according to multiple modulation techniques, such as frequency modulation, amplitude modulation (e.g., M-ary quadrature amplitude modulation, with M a positive integer); phase-shift keying; and so forth).

Access equipment and/or software related to access of a network also includes a processor 1016 configured to confer, at least in part, functionality to substantially any electronic component in access equipment and/or software. In particular, processor 1016 can facilitate configuration of access equipment and/or software through, for example, monitor component 1004, antenna component 1006, and one or more components therein. Additionally, access equipment and/or software can include display interface 1018, which can display functions that control functionality of access equipment and/or software or reveal operation conditions thereof. In addition, display interface 1018 can include a screen to convey information to an end user. In an aspect, display interface 1018 can be a liquid crystal display, a plasma panel, a monolithic thin-film based electrochromic display, and so on. Moreover, display interface 1018 can include a component (e.g., speaker) that facilitates communication of aural indicia, which can also be employed in connection with messages that convey operational instructions to an end user. Display interface 1018 can also facilitate data entry (e.g., through a linked keypad or through touch gestures), which can cause access equipment and/or software to receive external commands (e.g., restart operation).

Broadband network interface 1020 facilitates connection of access equipment and/or software to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 1020 can be internal or external to access equipment and/or software and can utilize display interface 1018 for end-user interaction and status information delivery.

Processor 1016 can be functionally connected to communication platform 1008 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1016 can be functionally connected, through data, system, or an address bus 1022, to display interface 1018 and broadband network interface 1020, to confer, at least in part, functionality to each of such components.

In access equipment and/or software memory 1024 can retain location and/or coverage area (e.g., macro sector, identifier(s)) access list(s) that authorize access to wireless coverage through access equipment and/or software sector intelligence that can include ranking of coverage areas in the wireless environment of access equipment and/or software, radio link quality and strength associated therewith, or the like. Memory 1024 also can store data structures, code instructions and program modules, system or device information, code sequences for scrambling, spreading and pilot transmission, access point configuration, and so on. Processor 1016 can be coupled (e.g., through a memory bus), to memory 1024 in order to store and retrieve information used to operate and/or confer functionality to the components, platform, and interface that reside within access equipment and/or software.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a system for mitigating nonlinearity from a nonlinear behavior comprising a transceiver, comprising a transmitter and a receiver, configured to transmit and receive signals in a signal processing pipeline configured to cancel self-interference originating from a transmitter path of the transmitter; a memory storing executable components; and a processor, coupled to the memory, configured to execute or facilitate execution of the executable components. The executable components comprise a polynomial kernel generator component configured to perform a polynomial computation in a log domain, generate a plurality of kernels that model the nonlinear behavior of the transmitter in the log domain using fixed-point arithmetic with one or more inputs and cancel, via the plurality of kernels, the self-interference to the signal processing pipeline of the receiver.

Example 2 is a system including the subject matter of example 1, wherein the signal processing pipeline comprises one or more serial pipelines corresponding to input components of an input signal of the one or more inputs and a plurality of parallel kernel outputs corresponding in number to the plurality of kernels, wherein the inputs are fixed-point inputs or floating point inputs.

Example 3 is a system including the subject matter of examples 1-2, including or omitting elements, wherein the executable components further comprise a distortion component configured to generate a model of the nonlinear behavior with segmented polynomial approximations based on the plurality of kernels to cancel the self-interference in the receiver.

Example 4 is a system including the subject matter of examples 1-3, including or omitting elements, wherein the transmitter is configured to generate the self-interference to the receiver by consuming more power than the receiver.

Example 5 is a system including the subject matter of examples 1-4, including or omitting elements, wherein the signal processing pipeline is configured as an all-digital, full-duplex or frequency division duplexing pipeline.

Example 6 is a system including the subject matter of examples 1-5, including or omitting elements, wherein the polynomial kernel generator component comprises a plurality of adders serially coupled to one another to generate the plurality of kernels.

Example 7 is a system including the subject matter of examples 1-6, including or omitting elements, wherein the signal processing pipeline comprises a quadrature component and an in-phase component that are processed independently along separate serial processing pathways of the polynomial kernel generator component into a decommutator that is configured to output the plurality of kernels in parallel.

Example 8 is a system including the subject matter of examples 1-7, including or omitting elements, wherein the polynomial kernel generator component is further configured to generate the plurality of kernels with a latency that comprises K+1, wherein K is an integer greater than zero and comprises a number of kernels of the plurality of kernels.

Example 9 is a system including the subject matter of examples 1-8, including or omitting elements, wherein the polynomial kernel generator component comprises: a plurality of adders coupled to one another along the signal processing pipeline configured to process an in-phase component and a quadrature component of an input signal; a plurality of log computation components configured to generate a log output in the log domain to at least two of the plurality of adders; and a plurality of anti-log components, respectively coupled to the plurality of log computation components, configured to generate an anti-log output from a logarithmic input provided by the at least two of the plurality of adders.

Example 10 is a system including the subject matter of examples 1-9, including or omitting elements, wherein the polynomial kernel generator component further comprises a scheduling component that generates selection signals that schedule generation of specific polynomial kernels via the plurality of adders based on a state of a finite state machine.

Example 11 is a system including the subject matter of examples 1-10, including or omitting elements, the polynomial kernel generator component is further configured to generate each kernel of the plurality of kernels in one clock cycle and the plurality of kernels in K+1 cycles, wherein K is a positive integer.

Example 12 is a system including the subject matter of examples 1-11, including or omitting elements, wherein the executable components further comprise: a kernel number component configured to determine a number of kernels of the plurality of kernels that linearly filter the self-interference based on a set of criteria related to an input of the receiver.

Example 13 is an apparatus configured to generate one or more polynomial kernels to cancel a non-linear behavior in a full-duplex communication mode, comprising: a polynomial kernel generator, via a controller, configured to perform a polynomial computation in a log domain, generate a plurality of kernels in the log domain that model the non-linear behavior of a transmitter path and cancel, via the plurality of kernels, a self-interference caused by the non-linear behavior of a non-linear component of the transmitter path in a receiver path.

Example 14 is an apparatus including the subject matter of example 13, wherein the polynomial kernel generator further comprises: a differential input path comprising, a first signal processing pathway and a second signal processing pathway, configured to receive a quadrature component and an in phase component of a differential input signal, respectively; a first select component configured to provide the in phase component to a first adder of the first signal processing pathway based on a finite state of the controller; a second select component configured to provide the quadrature component to a second adder of the second signal processing pathway based on the finite state of the controller; and a third select component configured to provide an output of the first signal processing pathway and the second signal processing pathway to a third adder based on the finite state of the controller.

Example 15 is an apparatus including the subject matter of examples 13-14, including or omitting elements, wherein the polynomial kernel generator further comprises a feedback path configured to provide an output of third adder to the second select component coupled to the second adder.

Example 16 is an apparatus including the subject matter of examples 13-15, including or omitting elements, wherein the polynomial kernel generator further comprises: a differential input path comprising a first signal processing pathway and a second signal processing pathway respectively comprising: a log component configured to utilize a piecewise linear approximation with a base-2 logarithm calculation of an input signal having self-interference from the transmitter path, and generate a logarithmic output; and an anti-log component configured to generate an anti-log of the logarithmic output from an anti-log computation adder.

Example 17 is an apparatus including the subject matter of examples 13-16, including or omitting elements, wherein a first adder of the first signal processing pathway and a second adder of the second signal processing pathway generates a different kernel of the plurality of kernels at each clock cycle.

Example 18 is an apparatus including the subject matter of examples 13-17, including or omitting elements, wherein the polynomial kernel generator further comprises a decommutator configured to output the plurality of kernels in parallel within the receive path and cancel the self-interference caused by the non-linear component of the transmitter path in the receiver path.

Example 19 is an apparatus including the subject matter of examples 13-18, including or omitting elements, wherein the non-linear component comprises a power amplifier, and the transmit path consumes more power than the receive path in response to operation in the full-duplex communication mode.

Example 20 is an apparatus including the subject matter of examples 13-19, including or omitting elements, wherein the polynomial kernel generator further comprises a differential input path comprising, a first signal processing pathway and a second single processing pathway, configured to receive a complex input components signals respectively and generate the plurality of kernels independently of a multiplier and as a function of three adders.

Example 21 is an apparatus including the subject matter of examples 13-20, including or omitting elements, wherein the polynomial kernel generator is further configured to generate the plurality of kernels that model the nonlinear behavior of the transmitter path, via a piecewise nonlinear polynomial approximation, in a cycle delay that is equal to a number of kernels of the plurality of kernels plus one.

Example 22 is a method for canceling self-interference of a full-duplex communication in a transceiver comprising a polynomial kernel generator, comprising: receiving, via a receiver of the transceiver, a differential input signal comprising self-interference from a transmitter of the transceiver; generating, via a controller, a polynomial computation in a log domain; generating one or more polynomial kernels that enable modeling of the nonlinear behavior of the transmitter in the log domain; and eliminating the self-interference from the transmitter within the receiver based on a nonlinear model with one or more piecewise polynomial approximations utilizing the one or more polynomial kernels.

Example 23 is a method including the subject matter of example 22, including or omitting elements, further comprising: scheduling inputs based on the differential input signal to be selectively inputted into three adders of the receiver; wherein the generating the one or more polynomial kernels comprises generating outputs of the three adders to a decommutator configured to provide a parallel output of the one or more polynomial kernels in K+1 clock cycles, wherein K comprises a number comprising a positive integer of the one or more polynomial kernels.

Example 24 is a method including the subject matter of examples 22-23, including or omitting elements, wherein the generating the polynomial computation in the log domain comprises performing a log of base 2 computation with a piece-wise linear approximation.

Example 25 is a method including the subject matter of examples 22-23, including or omitting elements, further comprising: performing an anti-log computation of the polynomial computation in the log domain and providing a result of the anti-log computation to at least one adder configured to generate the one or more polynomial kernels in a receive path of the receiver independent of a multiplication or a multiplier.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the acts and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. A system for mitigating nonlinearity from a nonlinear behavior comprising:
    a transceiver, comprising a transmitter and a receiver, configured to transmit and receive signals in a signal processing pipeline configured to cancel self-interference originating from a transmitter path of the transmitter;
    a memory storing executable components; and
    a processor, coupled to the memory, configured to execute or facilitate execution of the executable components, comprising:
        a polynomial kernel generator component configured to perform a polynomial computation in a log domain, generate a plurality of kernels that model the nonlinear behavior of the transmitter in the log domain using fixed-point arithmetic with one or more inputs and cancel, via the plurality of kernels, the self-interference to the signal processing pipeline of the receiver, wherein the polynomial kernel generator component comprises a scheduling component that generates selection signals that schedule generation of specific polynomial kernels via the plurality of adders based on a state of a finite state machine.

2. The system of claim 1, wherein the signal processing pipeline comprises one or more serial pipelines corresponding to input components of an input signal of the one or more inputs and a plurality of parallel kernel outputs corresponding in number to the plurality of kernels, wherein the inputs are fixed-point inputs or floating point inputs.

3. The system of claim 1, wherein the executable components further comprise:
    a distortion component configured to generate a model of the nonlinear behavior with segmented polynomial approximations based on the plurality of kernels to cancel the self-interference in the receiver.

4. The system of claim 1, wherein the transmitter is configured to generate the self-interference to the receiver by consuming more power than the receiver.

5. The system of claim 1, wherein the signal processing pipeline is configured as an all-digital, full-duplex or frequency division duplexing pipeline.

6. The system of claim 1, wherein the polynomial kernel generator component comprises a plurality of adders serially coupled to one another to generate the plurality of kernels.

7. The system of claim 1, wherein the signal processing pipeline comprises a quadrature component and an in-phase component that are processed independently along separate serial processing pathways of the polynomial kernel generator component into a decommutator that is configured to output the plurality of kernels in parallel.

8. The system of claim 1, wherein the polynomial kernel generator component is further configured to generate the plurality of kernels with a latency that comprises K+1, wherein K is an integer greater than zero and comprises a number of kernels of the plurality of kernels.

9. The system of claim 1, wherein the polynomial kernel generator component comprises:
a plurality of adders coupled to one another along the signal processing pipeline configured to process an in-phase component and a quadrature component of an input signal;
a plurality of log computation components configured to generate a log output in the log domain to at least two of the plurality of adders; and
a plurality of anti-log components, respectively coupled to the plurality of log computation components, configured to generate an anti-log output from a logarithmic input provided by the at least two of the plurality of adders.

10. The system of claim 1, the polynomial kernel generator component is further configured to generate each kernel of the plurality of kernels in one clock cycle and the plurality of kernels in K+1 cycles, wherein K is a positive integer.

11. The system of claim 1, wherein the executable components further comprise:
a kernel number component configured to determine a number of kernels of the plurality of kernels that linearly filter the self-interference based on a set of criteria related to an input of the receiver.

12. An apparatus configured to generate one or more polynomial kernels to cancel a non-linear behavior in a full-duplex communication mode, comprising:
a polynomial kernel generator, via a controller, configured to perform a polynomial computation in a log domain, generate a plurality of kernels in the log domain that model the nonlinear behavior of a transmitter path and cancel, via the plurality of kernels, a self-interference caused by the nonlinear behavior of a non-linear component of the transmitter path in a receiver path, wherein the polynomial kernel generator comprises a differential input path comprising, a first signal processing pathway and a second signal processing pathway, configured to receive complex input components of input signals respectively and generate the plurality of kernels independently of a multiplier and as a function of three adders.

13. The apparatus of claim 12, wherein the polynomial kernel generator further comprises:
the differential input path comprising, the first signal processing pathway and the second signal processing pathway, configured to receive a quadrature component and an in phase component of a differential input signal, respectively;
a first select component configured to provide the in phase component to a first adder of the first signal processing pathway based on a finite state of the controller;
a second select component configured to provide the quadrature component to a second adder of the second signal processing pathway based on the finite state of the controller; and
a third select component configured to provide an output of the first signal processing pathway and the second signal processing pathway to a third adder based on the finite state of the controller.

14. The apparatus of claim 13, wherein the polynomial kernel generator further comprises a feedback path configured to provide an output of third adder to the second select component coupled to the second adder.

15. The apparatus of claim 12, wherein the polynomial kernel generator further comprises:
the differential input path comprising the first signal processing pathway and the second signal processing pathway respectively comprising:
a log component configured to utilize a piece-wise linear approximation with a base-2 logarithm calculation of an input signal having self-interference from the transmitter path, and generate a logarithmic output; and
an anti-log component configured to generate an anti-log of the logarithmic output from an anti-log computation adder.

16. The apparatus of claim 15, wherein a first adder of the first signal processing pathway and a second adder of the second signal processing pathway generates a different kernel of the plurality of kernels at each clock cycle.

17. The apparatus of claim 16, wherein the polynomial kernel generator further comprises a decommutator configured to output the plurality of kernels in parallel within the receive path and cancel the self-interference caused by the non-linear component of the transmitter path in the receiver path.

18. The apparatus of claim 12, wherein the non-linear component comprises a power amplifier, and the transmit component consumes more power than the receive path in response to operation in the full-duplex communication mode.

19. The apparatus of claim 12, wherein the polynomial kernel generator is further configured to generate the plurality of kernels that model the nonlinear behavior of the transmitter path, via a piecewise nonlinear polynomial approximation, in a cycle delay that is equal to a number of kernels of the plurality of kernels plus one.

20. A method for canceling self-interference of a full-duplex communication in a transceiver comprising a polynomial kernel generator, comprising:
receiving, via a receiver of the transceiver, a differential input signal comprising self-interference from a transmitter of the transceiver;
generating, via a controller, a polynomial computation in a log domain;
generating one or more polynomial kernels that enable modeling of the nonlinear behavior of the transmitter in the log domain;
eliminating the self-interference from the transmitter within the receiver based on a nonlinear model with one or more piecewise polynomial approximations utilizing the one or more polynomial kernels; and performing an anti-log computation of the polynomial computation in the log domain and providing a result of the anti-log computation to at least one adder configured to generate the one or more polynomial kernels in a receive path of the receiver independent of a multiplication or a multiplier.

21. The method of claim 20, further comprising:
scheduling inputs based on the differential input signal to be selectively inputted into three adders of the receiver;
wherein the generating the one or more polynomial kernels comprises generating outputs of the three adders to a decommutator configured to provide a parallel output of the one or more polynomial kernels in K+1 clock cycles, wherein K comprises a number comprising a positive integer of the one or more polynomial kernels.

22. The method of claim 20, wherein the generating the polynomial computation in the log domain comprises performing a log of base 2 computation with a piece-wise linear approximation.

* * * * *